United States Patent Office 3,606,936
Patented Sept. 21, 1971

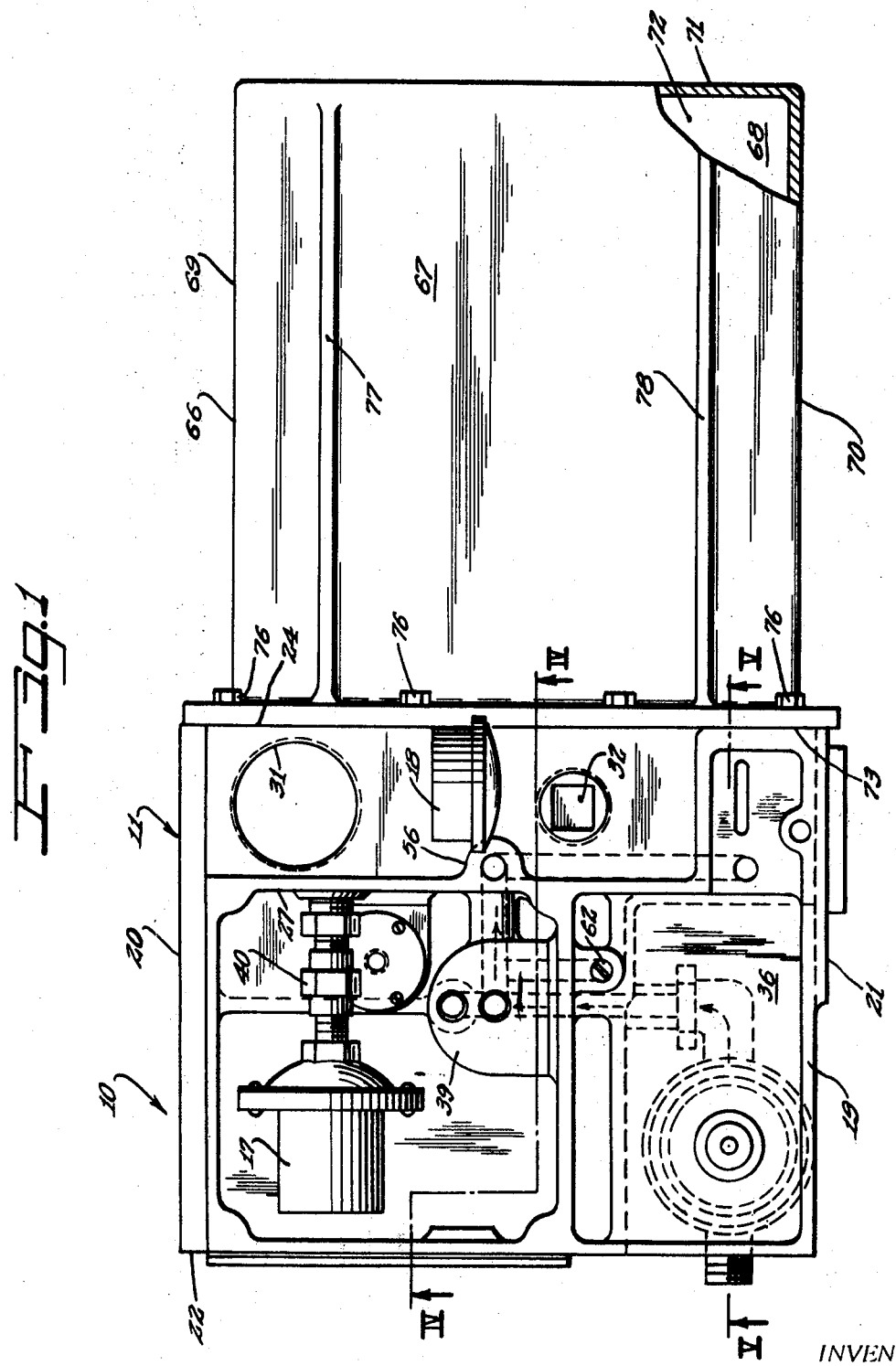

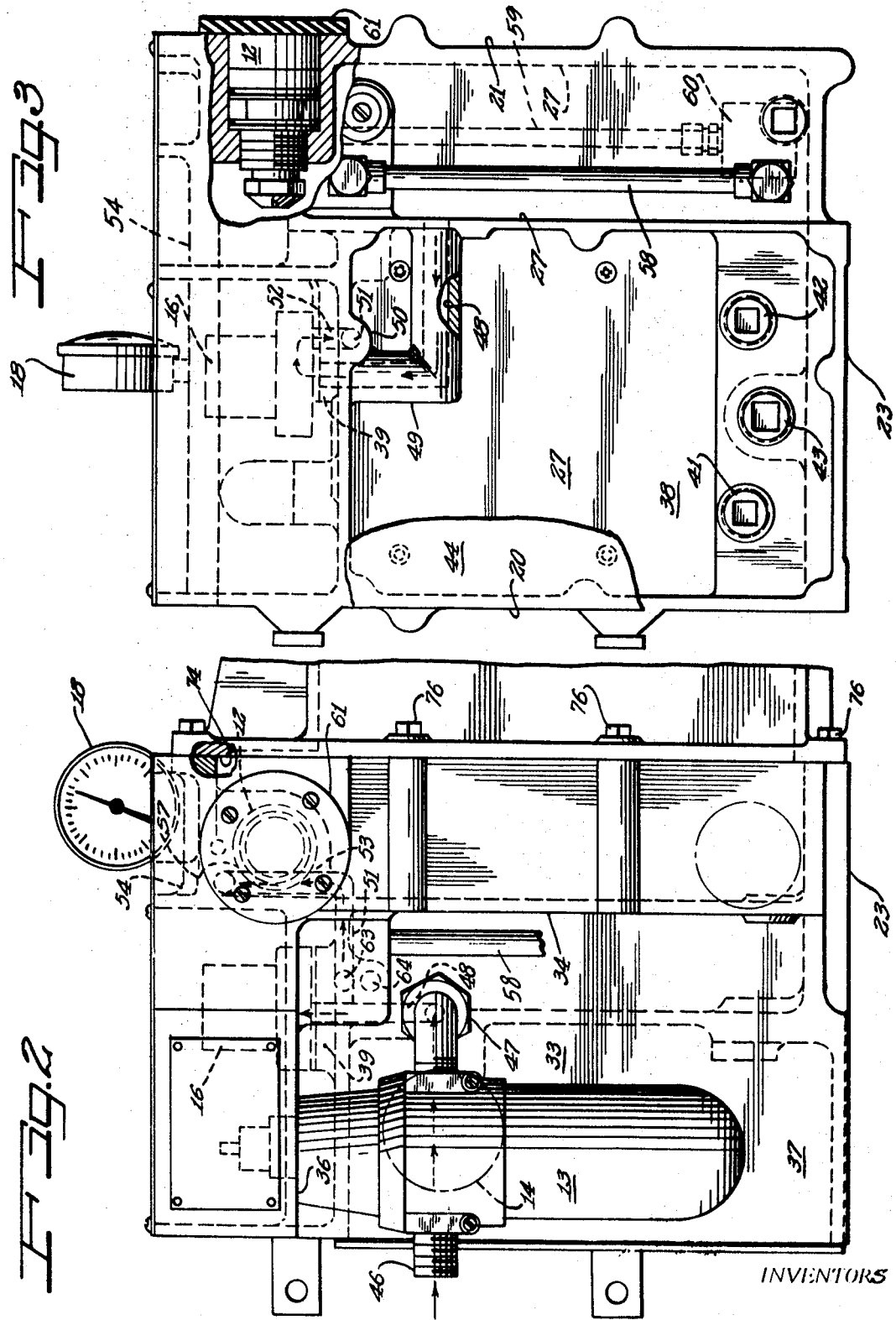

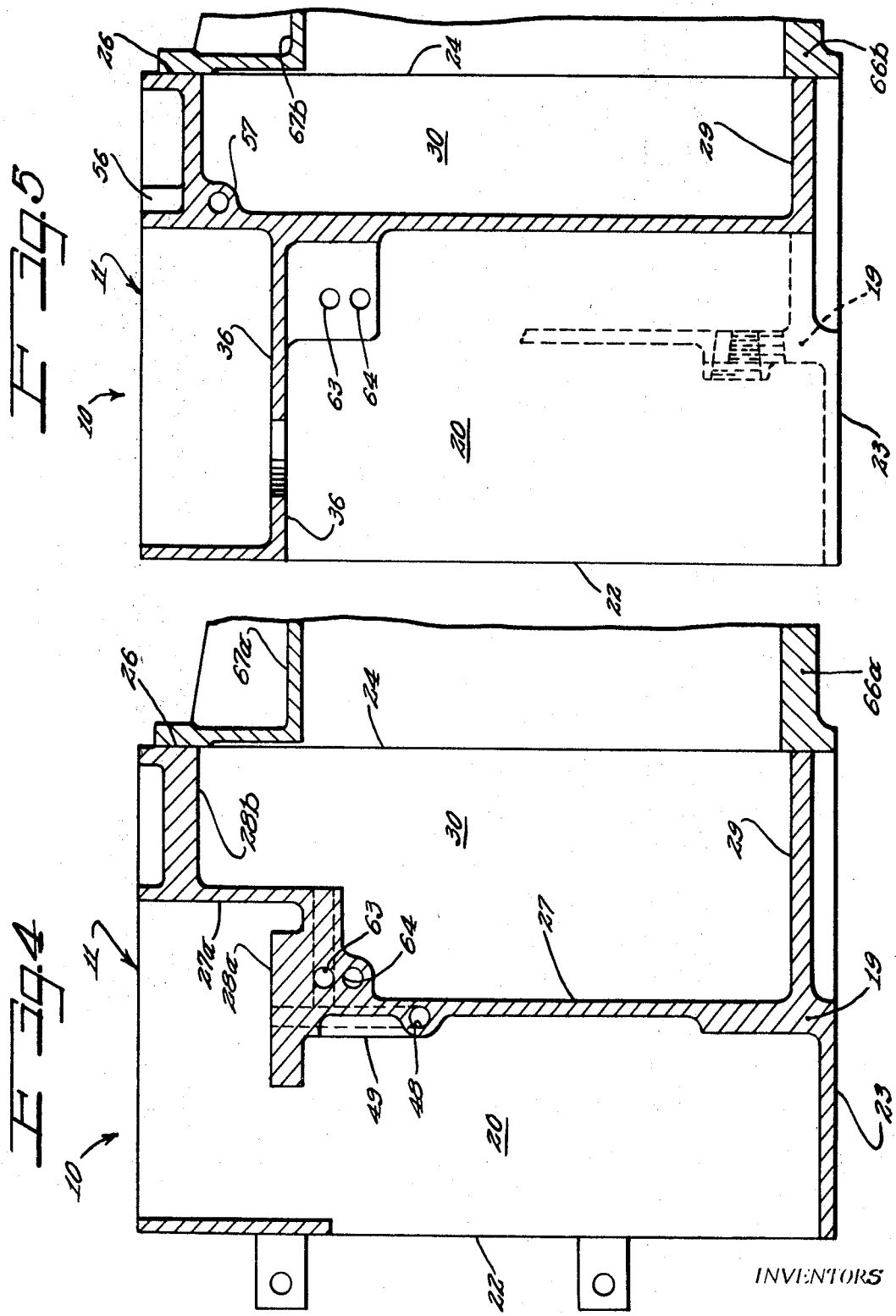

3,606,936
OIL MIST LUBRICATION SYSTEM
Ronald F. Obergefell, Richmond Heights, Edward E. Kish, Cleveland Heights, and Gerald C. McMillen, Chagrin Falls, Ohio, assignors to Houdaille Industries, Inc., Buffalo, N.Y.
Filed Dec. 12, 1969, Ser. No. 884,478
Int. Cl. F16n 7/32
U.S. Cl. 184—6.26                                6 Claims

ABSTRACT OF THE DISCLOSURE

An oil mist lubrication system for lubricating various points of use from a central location. The system includes a housing structure of one-piece metal cast construction so configured and arranged as to accommodate various components of the system including an air filter, an air solenoid valve and a mist generating head. An oil reservoir is provided by a chamber formed in the housing structure and is open along one vertical side. Various polymorphic closure structures are provided for closing the open side of the oil reservoir chamber. The closure structures may be individually removably mounted on the housing structure for effectively varying the volumetric capacity of the oil reservoir merely by changing from one closure structure to another.

BACKGROUND OF THE INVENTION

The present invention relates generally to the field of lubrication. More particularly, the invention relates to a centralized oil mist lubrication system for supplying lubricant in the form of an oil mist or fog from a central location of various points of use. More specifically, the invention relates to an improved housing structure for mounting and enclosing the various components which comprise such a system.

Oil mist lubrication systems per se are known in the prior art. Examples of such systems are disclosed in Ronald F. Obergefell et al. U.S. application Ser. No. 745,546 entitled "Oil Mist Lubricating System" and now Pat. No. 3,491,855, assigned to the assignee of the present invention. Another example is disclosed in Haywood U.S. Pat. No. 3,191,718.

Reference to prior art systems immediately discloses the fact that a variety of components are utilized in an oil mist lubrication system and also discloses the variety and number of the various housing members employed in enclosing and mounting the various components. In addition, the relatively complex and expensive piping arrangements heretofore utilized may be readily appreciated.

While serious efforts to increase the capacity, operability and applications of oil mist lubrication systems have been made in the past, little attention has been given heretofore in improvements in the basic housing structure, mounting and plumbing arrangements of such systems. As a consequence, the manufacturing costs of such systems, the overall appearance thereof and the relative ease of maintenance and replacement of parts have left much to be desired in connection with such systems.

SUMMARY OF THE INVENTION

The present invention addresses itself primarily to a solution of the problems mentioned above. As a consequence of the invention, the overall manufacturing cost of an oil mist lubrication system is materially reduced. Furthermore, the entire plumbing arrangement is simplified and various components which make up the system are not only more greatly protected from damage but furthermore, are more accessible for easy inspection and replacement.

In addition, the overall appearance of the system is materially improved and flexibility in oil reservoir capacity is greatly expanded.

The invention may be summarized as comprising an improved housing structure for an oil mist lubrication system affording all of the advantages set forth above. From one view the invention comprises a one-piece metal cast housing specially adapted to conveniently mount and enclose various components of the system. Another aspect of the invention relates to various passageway means formed integrally with the one-piece casting to greatly simplify the plumbing arrangement. Another aspect of the invention relates to polymorphic structures forming in part the oil reservoir of the system and adapted to provide great flexibility in reservoir capacity while simplifying and minimizing inventory problems generally associated with such variations in capacity.

BRIEF DESCRIPTION OF THE DRAWINGS

FIG. 1 comprises a top plan view of an improved housing structure for an oil mist lubrication system constructed in accordance with the principles of the present invention and having mounted thereon certain of the basic components of the system.

FIG. 2 is a side elevational view of the housing structure of FIG. 1 with portions thereof cut away.

FIG. 3 is a rear elevational view of the structure of FIG. 1 with some of the ancillary components removed for clarity.

FIG. 4 is a cross sectional view of the housing structure taken along lines IV—IV of FIG. 1.

FIG. 5 is another cross sectional view taken along the lines V—V of FIG. 1.

DESCRIPTION OF THE PREFERRED EMBODIMENT

In general an oil mist lubrication system may be considered to comprise an oil mist generating head which is supplied simultaneously with a stream of pressurized air (the pressure thereof generally depending upon the type of generating head employed and the viscosity of the oil being used as the lubricant), and a stream of oil. The mist generating head utilizes the air to atomize the oil into very fine particles. The oil is supplied to the generating head from an oil reservoir and generally the oil mist produced by the generating head is directed back to the oil reservoir above the level of oil therein so that the larger particles of oil may drop out of the mist and back into the liquid oil. The mist is then directed through a conduit system normally made of copper tubing to plural points of use such as the various bearings of a large machine. Structures often referred to as "reclassifiers" are employed at the points of use for converting the mist into droplets of oil, which droplets then directly lubricate the bearing surfaces.

In addition to the mist generating head an oil mist lubrication system will generally include such items as an air filter, an air pressure regulator, an air solenoid valve for controlling the supply of air to the generating head, an oil heater for maintaining the temperature of the oil in the reservoir at a predetermined level, thermostats for controlling the operation of the oil heater and the like. Various controls are also generally employed to render the operation of the lubrication system completely or partly automatic.

Referring to the drawings there is disclosed generally therein an oil mist lubrication system identified or designated at reference numeral 10. Some of the basic components of the system 10 include a housing structure 11, and oil mist generating head 12, an air filter 13 having an air pressure regulator 14 mounted thereon, an air solenoid valve 16, an oil mist high-low pressure switch 17 and a mist pressure gauge 18. The function of each of these components is, of course, well known to those who are skilled in the art.

The structure 11 comprises a one-piece cast metal body or housing 19 which is generally configured in a shape of a parallelepiped. The body 19 includes various wall members cast integrally therewith to provide various chambers which perform various functions, as described more fully hereinafter.

More particularly the body 19 comprises a pair of vertical side walls 20 and 21, a back wall 22 and a bottom wall 23. A front side of the body 19 indicated at reference numeral 24 is open and around this open side is formed an abutment wall 26, the purpose of which will be described hereinafter.

The body casting 19 may be more particularly characterized as comprising the vertical wall 27, a pair of horizontal walls 28a and 28b and another horizontal wall 29 which together form a chamber 30 which opens to the fluid side 24 of the body 19. Chamber 30 serves as a reservoir for the oil used in the generation of mist and an outlet 31 is formed in the wall 28 for receiving an oil mist header which is suitably manifolded to direct the mist to the various points of use of lubrication. An oil fill plug 32 is also mounted on the horizontal wall 28 for replenishing the supply of oil in the reservoir 30. The mist pressure gauge 18 is also mounted on the wall 28 for indicating the pressure of the mist in the reservoir 30 above the oil level. The side walls 20 and 21 of the body 19 form the side walls of the chamber 30, the side wall 21 also serving as a mounting member for the mist generating head 12 which is located within the chamber 30 but above the level of oil therein.

The cast body 19 also comprises vertical wall members 33 and 34 which, together with a horizontal wall 36 form another chamber or recess 37 at one corner of the body 19. The chamber 37 is open along the side wall 21, the back wall 22 and the bottom wall 23 of the body 19 and the air filter 13 is disposed therewithin. Another chamber 38 is formed in the body 19 and is bounded at the lower end thereof by the bottom wall 23, is bounded at the sides thereof by the wall members 20 and 21 and at the front side thereof by the wall 27. The air solenoid valve 16 and the mist high-low pressure switch 17 are located within chamber 38, the solenoid valve 16 being mounted on a horizontal flange 39 projecting from the vertical wall 34 and merging into the horizontal wall 28a and the pressure switch 17 being secured to the vertical wall 27 at an upper portion 27a thereof by suitable piping connections as indicated at reference numeral 40. High and low temperature thermostats 41 and 42 and an oil heater 43 may be mounted on the wall 27 at the lower end thereof, the sensing and heating elements thereof extending through the wall and the oil reservoir 30. An end plate 44 may be provided on the rear wall 22 of the body 19 to close off the rear side of the chamber 38 and suitable fasteners such as threaded bolts or the like may be used to secure the plate 44 to the wall 22.

The pressurized air used in the operation of the mist generating head 12 may be supplied from any suitable source and a threaded coupling 46 is mounted on the air filter 13 for connection to the source. A right angle pipe connection 47 is connected to the outlet side of the air filter 13 and opens to the vertical wall 27 in communication with an air flow passageway 48 formed in a right-angle embossment 49. The embossment 49 is formed integrally with the vertical wall 27 and is an integral part of the body casting 19. The flow passageway 48 may be drilled in the embossment 49 from the vertical wall 27 and from the flange 39 on which is mounted the air solenoid valve 16.

Also provided as an integral part of the body 19 is an embossment 50 which is drilled as at 51 to provide another flow passageway. Passageway 51 communicates with a vertical passageway 52 drilled in the solenoid valve mounting bracket 39 and additionally communicates with another vertical passageway 53 and a horizontal passageway 54 formed respectively in embossments 56 and 57 provided on the vertical wall 27 as an integral part thereof. The flow of air is thus from the coupling 46, through the air filter 13 and the pipe connection 47 to passageway 48, and thence through the air solenoid valve 16 and passageways 52, 51, 53 and 54 to the mist generating head 12. The utilization of passageways 48, 52, 51, 53 and 54, all of which may be drilled or cast in the body casting 19, greatly reduces the cost and simplifies the entire plumbing arrangement for the pressurized air from the filter 13 to the mist generating head 12.

The oil in the reservoir or chamber 30, the level of which may be ascertained by means of a sight glass 58, is conveyed to the mist generating head 12 by means of an oil pipe 59 extending down into the reservoir 30 below the level of oil. An oil filter 60 is mounted at the lower end of the oil pipe 59. In some applications of oil mist lubricating systems the oil may be pumped from the reservoir to the mist generating head whereas in other situations, for example, when venturi-type generating heads are utilized, the oil may be drawn by aspiration up into the generating head 12. A transparent plastic window 61 may be mounted across an aperture formed in the side wall 21 of the body 19 to provide a visual inspection of the mist generating head.

An air by-pass valve 62 is mounted in the vertical wall 36 and communicates the adjacent ends of a pair of vertical passageways 63 and 64. The opposite end of passageway 63 intersects air passageway 51 at right angles thereto whereas the opposite end of passageway 64 opens into the chamber 38. The flow rate of air to the mist generating head 12 may be selectively controlled by virtue of the air passageway valve 62 with a constant pressure air source.

The abutment wall 26 surrounding the open end 24 of the oil reservoir 30 is adapted to receive a variety of polymorphic closure structures which may be selectively utilized to vary the volumetric capacity of the reservoir 30. For example, referring to FIG. 1, a closure structure designated generally at reference numeral 66 is formed of a one-piece casting having horizontal top and bottom walls 67 and 68, vertical side walls 69 and 70 and a vertical end wall 71 which together form a hollow chamber 72 in open communication with the chamber 30 of the body casting 19 through an open side 73 thereof. The open side 73 is surrounded by a flat abutment wall 74 shaped complementarily to the abutment wall 24 of the body casting 19. The closure structure 66, which provides additional reservoir capacity for the oil, may be mounted on the body casting 19 by any suitable means such as a plurality of threaded bolts indicated at reference numerals 76.

In lubrication systems requiring a reduced mist flow rate the open side 24 of the oil reservoir 30 may simply be closed off by means of a flat plate, the consequence of which being that the volumetric capacity of the chamber 30 represents the total maximum oil reservoir capacity of the system 10. In applications requiring increased mist flow rates, however, the effective volumetric capacity of the reservoir 30 may be increased by means of the closure 66 since the total reservoir capacity of the system 10 comprises the reservoir capacities of both the chamber 30 and the hollow 72 of the closure 66.

The present invention contemplates the utilization of a plurality of closure structure 66 of different sizes so that the total reservoir capacity of the system 10 may be selectively varied. For example, the reservoir capacity of the closure structure 66 shown in FIG. 1 may be ten gallons. The closure structure 66a shown in FIG. 4, due to an increase in the longitudinal dimension, may be twenty gallons, whereas the closure structure 66b shown in FIG.

5 may have a capacity of thirty gallons. It should be understood that the dimensions of closure structures 66, 66a and 66b at the end thereof abutting the end wall 24 of the body 19 are all identical to facilitate interchangeability of the various closure structures with the body casting 19.

The utilization of the polymorphic closure structures 66, 66a and 66b also greatly simplifies manufacturing and inventory problems since a single body casting 19 can be utilized over a wide range of lubrication system capacities since the reservoir capacity of the system 10 can be matched with the requirements of a wide variety of applications.

A pair of longitudinal ribs 77 and 78 are formed on the top wall 67 of the closure structure 66 to rigidify the closure structure, particularly the larger sizes thereof since the weight of the oil contained therein becomes quite significant in the larger capacities.

Although minor modifications might be suggested by those versed in the art it should be understood that I wish to embody within the scope of the patent warranted hereon all such modifications as reasonably come within the scope of my contribution to the art.

What we claim is:

1. Housing structure for use in an oil mist generator for lubrication purposes comprising:
   a one-piece metal cast body comprising means forming first, second and third separate and separated chambers,
   said first chamber having one open side and serving as an oil reservoir and including means for mounting a mist generating head therewithin,
   means for mounting in said second and third chambers respectively an air solenoid valve and an air filter, and removable closure means for closing the open side of said first chamber,
   said housing structure comprising means formed integrally therewith for providing air flow passageways for interconnecting the air filter, the air solenoid valve and the mist generating head.

2. The invention as defined in claim 1 wherein said housing structure further comprises integral wall means separating said first, second and third chambers and containing therewithin said air flow passageways.

3. The invention as defined in claim 1 wherein said housing structure is configured generally in the shape of a parallelepiped and said third chamber is formed in a recess located at one corner of the parallelepiped and open on three sides for easy access to the air filter.

4. The invention as defined in claim 1 wherein said housing structure further comprises:
   wall means formed integrally therewith separating said first and second chambers and having formed thereon means for mounting a high temperature thermostat, a low temperature thermostat and an oil heater in said second chamber, and
   means forming apertures in said wall means for enabling the sensing portions of said thermostats and the heating portion of said heater to extend through said wall means into said first chamber.

5. The invention as defined in claim 1 and including means formed integrally with said housing structure for receiving an air by-pass valve for by-passing air between said air solenoid valve and said mist generating head and means formed integrally with said housing structure forming additional air passageways interconnecting said air flow passageways at a point between said air solenoid valve and said mist generating head and said first chamber.

6. An oil mist lubrication system comprising:
   a housing structure made of one-piece cast metal construction and being configured generally in the shape of a parallelepiped and having wall means forming a first generally vertical chamber open along one vertical side thereof and serving as an oil reservoir, a second chamber adjacent but separated from said first chamber and open along a top side and one vertical side thereof and a third chamber adjacent but separated from said first and second chambers and formed in a corner of said parallelepiped and open along two vertical sides and a bottom side thereof,
   means for mounting a mist generating head in said first chamber, an air solenoid valve, an oil heater and thermostats in said second chamber and an air filter in said third chamber,
   means formed integrally with and as a part of said wall means of said housing structure for providing drilled air passageways communicating said first, second and third chambers,
   means forming an abutment wall on said housing structure around said open side of said first chamber,
   plural closure means having means forming hollow supplemental oil reservoir chambers therewithin different in volume one from the other and each having an abutment wall shaped and sized complementarily to the abutment wall of said housing structure for mating therewith in fluid sealing relation, and
   means for removably individually securing said plural closure means to said housing structure for selectively varying the effective volumetric capacity of said oil reservoir.

References Cited

UNITED STATES PATENTS

| | | | |
|---|---|---|---|
| 2,753,013 | 7/1956 | Tear | 184—55A |
| 2,776,025 | 1/1957 | Schweisthal | 184—55A |
| 3,191,718 | 6/1965 | Haywood | 184—6ZX |
| 3,439,777 | 4/1969 | Gothberg | 184—55A |
| 3,527,411 | 9/1970 | Colgan | 184—55AX |

FOREIGN PATENTS

| | | | |
|---|---|---|---|
| 1,036,066 | 7/1966 | Great Britain | 184—6Z |

MANUEL A. ANTONAKAS, Primary Examiner

U.S. Cl. X.R.

184—55A